United States Patent [19]
Herr et al.

[11] 4,081,750
[45] Mar. 28, 1978

[54] ANTENNA COUPLER WITH AUTOMATICALLY SWITCHED DUMMY LOAD

[75] Inventors: Ronald P. Herr, Warren; Kenneth W. Maurin, Fraser, both of Mich.

[73] Assignee: Ken-Herr & Associates, Southfield, Mich.

[21] Appl. No.: 763,364

[22] Filed: Jan. 28, 1977

[51] Int. Cl.² ............................................. H04B 1/02
[52] U.S. Cl. .................... 325/150; 325/354; 325/178; 343/702; 343/894
[58] Field of Search .............. 325/150, 102, 112, 128, 325/133, 178, 354, 363, 176; 343/702, 850, 878, 894

[56] References Cited
U.S. PATENT DOCUMENTS

| | | | |
|---|---|---|---|
| 1,884,655 | 10/1934 | Gebhard | 325/150 |
| 2,081,711 | 5/1937 | Polin | 325/178 |
| 2,214,685 | 9/1940 | Stone, Jr. | 343/894 |

FOREIGN PATENT DOCUMENTS

| | | | |
|---|---|---|---|
| 2,415,370 | 10/1974 | Germany | 325/354 |

*Primary Examiner*—Benedict V. Safourek
*Assistant Examiner*—Tommy P. Chin
*Attorney, Agent, or Firm*—Krass & Young

[57] ABSTRACT

An antenna coupling adapter device is disclosed of a type designed to connect an antenna to the output antenna jack of portable radio transmitter-receivers such as Citizens Band units. The adapter is comprised of a first coupling mating with the antenna output jack provided on the transmitter unit, a second coupling adapted to mate with the antenna coupling and the adapter also including a switch and a dummy resistive load comprised of an indicator lamp. The antenna coupling, when installed, actuates an operating plunger to operate the switch by seating and unseating of the antenna coupling to cause the switch to electrically connect either the antenna or the indicator lamp, respectively, to the transmitter output stage via the first coupling means so as to cause the indicator lamp to be automatically switched in as a dummy resistive load. This prevents accidental operation of the radio transmitter with the antenna disconnected to preclude an overload condition, while the indicator lamp makes the operator aware of the disconnected antenna upon making an attempted transmission, and also allows a modulation function check.

8 Claims, 4 Drawing Figures

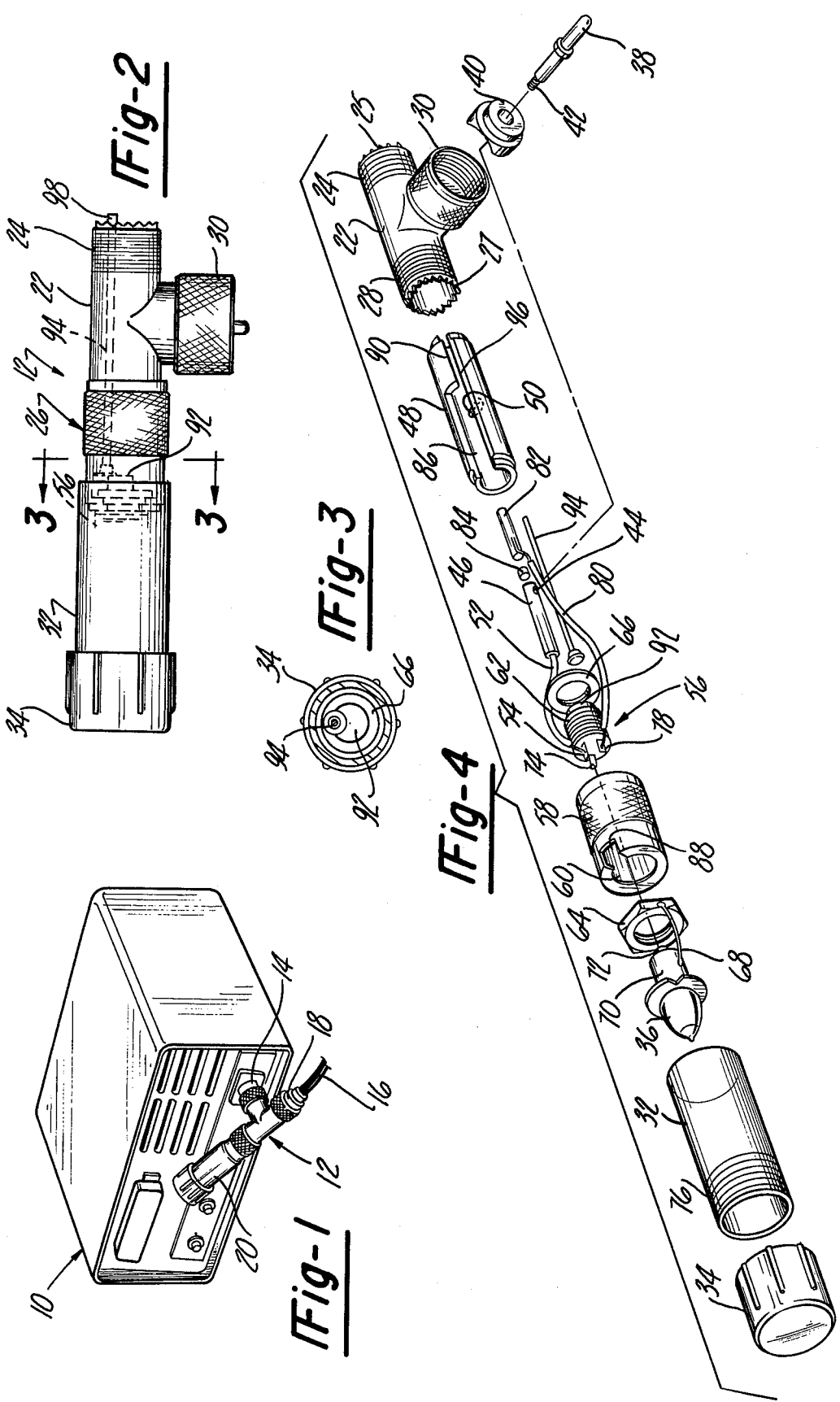

ANTENNA COUPLER WITH AUTOMATICALLY SWITCHED DUMMY LOAD

BACKGROUND OF THE INVENTION

This invention concerns radio transmitters and, more particularly, mobile or portable type radio transmitters, such as the currently popular Citizens Band or "CB" radio units in which the antenna is frequently connected and disconnected from the unit. A problem is inherent in the design of these units, inasmuch as if the transmitter is attempted to be operated when the antenna has been inadvertently left unconnected to the transmitter output stage, overload of the output stage of the transmitter will occur, due to the absence of an external load, i.e. the antenna, to absorb the power of the transmitter output stage causing failure of the components. While protective circuitry has in the past been incorporated in communication devices, the relatively low price of these units has precluded the inclusion of any such protective devices in "CB" units. Thus, many of the millions of units in the field have become casualties to this inadvertence by the operator to properly connect his antenna to the transmitter unit prior to operation.

It is an object of the present invention to provide a device for preventing such damage from occurring due to operation of the transmitter unit with the antenna uncoupled.

It is a further object of the present invention to provide a device for preventing such damage which device is readily installed on existing transmitter units without necessitating the use of special tools or rewiring of the unit.

It is a still further object of the present invention to provide such a device which is relatively low in cost and adaptable to such low cost devices as the cheaper "CB" units.

It is yet another object of the present invention to provide such a device which provides the operator with an indication of the fact of the antenna being uncoupled from the transmitter unit upon attempted operation of the "CB" unit, which indication is provided without the need for an external power source.

SUMMARY OF THE INVENTION

These and other objects which will become apparent upon a reading of the following Specification and Claims are accomplished by a coaxial adapter device having a first coupling mating with the radio transmitter unit at the antenna output jack, with a second coupling means included with the antenna coupling adapted to be connected to the adapter device. The adapter device also includes an integral switch operated by installation of the antenna coupling or the second coupling means which acts to electrically connect the first coupling means to either a dummy resistive load constituted by an incandescent lamp mounted to the adapter device or to the second coupling means. The switch is operated by a switch extending plunger engaged by a radial face of the antenna coupling so as to automatically connect the resistive dummy load to the first coupling means when the antenna is disconnected, but connect the second coupling means to the first coupling means upon installation of the antenna coupling. The lamp impedance is selected to be related to that of the antenna so as to properly load the transmitter output stage to prevent overload. The lamp provides a visual indication of the disconnected condition of the antenna and also may function as a modulation function indicator.

BRIEF DESCRIPTION OF THE DRAWINGS

FIG. 1 is a perspective view of the antenna coupler device according to the present invention installed on the rear of a "CB" transmitter.

FIG. 2 is an elevational view of the coupler assembly shown in FIG. 1.

FIG. 3 is a view of the section 33 taken in FIG. 2.

FIG. 4 is an exploded perspective view of the coupler assembly shown in FIGS. 1 through 3.

DETAILED DESCRIPTION

In the following detailed description certain terminology will be utilized in the interests of clarity and a specific embodiment described in accordance with the requirements of 35 USC 112, but it is to be understood that the same is not intended to be limiting and should not be so construed, inasmuch as the invention is capable of many variations within the scope of the appended claims.

Referring to FIG. 1, a typical "CB" radio transmitter-receiver or transceiver unit 10 is shown, from the rear, with an antenna coupling adapter device 12 according to the present invention connected to the output jack 14, normally provided for connection of the antenna lead 16 and associated coaxial coupling 18. In practice once the coupling assembly 12 is installed on the antenna jack 14, it will remain permanently in place, with the antenna coupling 18 connected and disconnected in subsequent hookups of the unit, as will be described hereinafter in more detail. The adapter device 12 includes an indicator lamp assembly 20, to be described in detail hereinafter which illuminates the rear of the "CB" transceiver unit 10 whenever the antenna coupling 18 is disconnected, the illumination being visible, notwithstanding the shielded position of the same behind the transceiver unit 10 housing, since the output power of the unit is fully applied to the indicator lamp.

Referring to FIGS. 2 through 4, the various components of the adapter device 12 are depicted. The antenna adapter device 12 is comprised of an adapter assembly, the various components thereof being carried by a tee housing 22. The tee housing 22 has an intermediate opening associated with a first coupling means adapted to be electrically connected to the output of the radio transmitter unit by an appropriate mating relationship with the antenna output jack 14.

The tee housing 22 also has a pair of opposed openings at either end, 24 and 28, thereof, one, 24, associated with a second coupling means adapted to mate with the antenna coupling 18, and the other, 28, mounting a switch-lamp assembly 26. The indicator lamp assembly 20 includes a translucent light shield 32, made of a frosted white translucent plastic with an end cap 34 to protect an incandescent lamp 36 over which the light shield 36 is disposed and to defuse the light emitted.

According to the concept of the present invention, the incandescent lamp 36 is electrically connected to the output stage of the radio transmitter unit 10 whenever the antenna coupling 18 is disconnected from the second coupling means, but is automatically disconnected when the antenna coupling 18 is installed, the transmitter output stage then being electrically connected to the antenna leads 16.

In coaxial type connectors, one side of the electrical circuit connections are often made through mating a central male and female contacts and the other side through the metallic sleeves and housing components included in such connectors. This is the scheme in the present adapter device 12, i.e. the "hot" side of the circuit input from transmitter stage is carried by a central male contact 38 adapted to be received within a corresponding female contact included in the antenna output jack 14. The circuit ground connection is created through mating of coupling sleeve 30 with a corresponding threaded section (not shown) formed on the antenna output jack 14. Together these form the first coupling means referred to above. The male contact 38 passes through an insulating spacer 40 disposed within the threaded coupling sleeve 30 and has a threaded end portion 42 received within a corresponding threaded bore 44 formed in a conductive connector 46 disposed within the tee housing 22 and within a plastic insulating sleeve 48, shown rotated 90° in FIG. 4, also disposed within the tee housing 22 with an aperture 50 formed within the side thereof to provide clearance for the male contact 38. As noted, the ground side of the circuit is carried via the internally threaded sleeve 30 and the tee housing 22 to both of the threaded end portions 24 and 28 which make the ground connection for either the antenna coupling 18 or the incandescent lamp 36, as will be described. The connector 46 has soldered thereto a lead 52 which is soldered to the input terminal 54 of a two lead on to on button operated switch 56. The switch 56 is retained within the tee housing 22 by means of an internally threaded sleeve 58 received over the threaded end portion 28. The internally threaded sleeve 38 has a central opening 60 through which a threaded base portion 62 of the switch 56 projects, engaged by a lock nut 64. The switch 56 has in its other end a reduced threaded portion on which is received a threaded washer 66, so as to securely position the switch 56 within the threaded sleeve 58 with the base portion 62 projecting through the opening 60.

The incandescent lamp 36 is grounded via lead 68, soldered to the lock nut 64 and to the base 70 of the incandescent lamp 36 while the central contact 72 of the incandescent lamp 36 is soldered to one of the output terminals 72 of the switch 56, shown in FIG. 4 as disconnected.

The translucent light shield 32 is sized to be friction fit over the outside diameter of the threaded sleeve 58 with the end cap 34 threaded on the end portion, as shown in FIG. 4.

The other output terminal 78 of the switch 56 has soldered thereto a lead 80, which extends towards the end portion 24 which is soldered to a female contact element 82, as shown in FIG. 4, with an insulator spacer 84 positioned to separate the female contact end portion 82 and the contact conductor 46. Clearance for the leads 80 and 52 into the insulating spacer 48 is provided by a slot 86 in the top thereof, whereas clearance for these leads to pass out of the internal sleeve 58 is provided by slot 88 formed in the sleeve 58.

Female contact 82 is received within a corresponding bore 90 formed in the spacer insulator 48. The spacer insulator 48 is located within the tee housing 22 so that the female contact 82 is positioned flush with the exterior thereof, so as to properly receive the corresponding male contact included in the antenna coupling 18. The female contact 82 and the threaded end portion thus constitutes the second coupling means referred to above.

The on to on switch 56 is of the type in which an input terminal is connected alternatively to either one or the other of a pair of output terminals, depending on the position of a spring loaded operating button 92. In this instance when the spring loaded button 92 is released, the terminal 74 is connected to the input terminal 54 so as to energize the incandescent lamp 36. Whenever the spring loaded button is pressed, the input terminal 54 is connected to the output terminal 78 and, via lead 80, connects the female contact 82, so as to electrically connect the second coupling means to the first coupling means.

Accordingly, the switch 56 is operated by means of a switch operating plunger 94 extending between the opposed openings of the tee housing 22 through a clearance slot 96 formed in the insulator spacer 48, and is spring biased so as to project at 98 (FIG. 2) beyond the face of the insulator spacer 48 at one end by virtue of the other end engaging the spring operated switch button 92.

Thus, when the antenna coupling 18 is installed, the plunger 94 is forced to the left, as shown in FIG. 2, by engagement of the projecting end portion 98 with a shoulder formed on the antenna coupling 18, so that switch means are provided to automatically disconnect the incandescent lamp 36 from the transmitter output circuit and connect the antenna to the transmitter output circuit via the first and second coupling means. The impedance of the lamp 36 should be appropriately related to the transmitter output stage and be designed to a wattage capable of absorbing the power output of the transmitter stages. In a specific embodiment, a 5 watt, 52 ohm, lamp was utilized. Thus, in practice, the operator need only install the adapter device 12 into the antenna jack 14 to accord the unit 10 a completely fail-safe operation as regards the operation of the transmitter with or without the antenna installed. No external power source is required, and no tools are required to install the same, installation being accomplished within a matter of seconds.

The incandescent lamp 36 may also provide an incidental modulation function indication, since the light intensity emitted by the incandescent bulb 36 will vary in correspondence with the modulation produced in the carrier wave by the transmitter which may be noted by the operator by observing the lamp as an attempted transmission is carried out. Inasmuch as the components of such units to which the "CB" units to which the present concept has particular application are standardized, the adapter device is useable with all units currently on the market and requires no modification of these units. Accordingly, it is available to provide protection to those many millions of units already in the field. It may also be seen that the relatively simple low cost design renders the device feasible to be used in conjunction with the relatively low cost equipment prevalent in this market.

Many modifications of the specific configuration of the device are of course possible, i.e. the design could be modified to allow the insulation spacer 48 itself to act as the plunger means, rather than utilizing a separate plunger member, as described.

The embodiments of the invention in which an exclusive property or privilege is claimed are defined as follows:

1. An adapter device for electrically connecting an antenna to a radio transmitter unit, with the radio transmitter unit being of the type provided with an output jack for coupling said antenna to said radio transmitter unit, the device comprising: an adapter assembly including a first coupling means adapted to electrically connect said adapter assembly to said transmitter antenna output jack; second coupling means adapted to mate with an antenna coupling; resistive load means impedance related to said radio transmitter unit output to prevent overload thereof when electrically connected thereto; switching means operated by mating of said antenna coupling with said second coupling means to electrically connect alternatively said resistive load means or said second coupling means to said transmitter output jack via said first coupling means, upon disconnection or connection of said antenna coupling, respectively, whereby said resistive load is automatically electrically connected to said radio transmitter unit output to protect said transmitter means output stage upon disconnection of said antenna from said device.

2. The device according to claim 1 wherein said resistive load comprises an indicator element providing an indication whenever said resistive load means is connected to said transmitter output stage.

3. The device according to claim 2 wherein said indicator device comprises an incandescent lamp means.

4. The device according to claim 1 wherein said adapter assembly includes a tee housing having an intermediate opening thhereof included in said first coupling means, one of a pair of opposed openings in said tee housing included in said second coupling means, and, said other of said aligned openings receiving said resistive load means and said switching means.

5. The device according to claim 4 wherein said switching means includes a plunger means extending between said pair of aligned openings and further includes a switch mounted in said other of said pair of aligned openings, said plunger means operatively engaging said switch to control said alternative electrical connection of said first coupling means to either said resistive load or said second coupling means.

6. The device according to claim 5 wherein said plunger means has a portion thereof biased to the position whereat a portion thereof protrudes out of said one of said pair of aligned tee housing openings so as to be engaged with said antenna coupling upon installation thereof.

7. The device according to claim 5 wherein said switch comprises an on to on switch operated by said plunger means to alternatively connect one of a pair of output terminals to an input terminal, said input terminal connected to said first coupling means, said output terminals connected, respectively, to said resistive load and said second coupling means.

8. The device according to claim 3 further including a translucent white shield surrounding said incandescent lamp.

* * * * *